United States Patent [19]
Sato

[11] Patent Number: 4,494,377
[45] Date of Patent: Jan. 22, 1985

[54] BRAKE BOOSTER OPERATED ALSO BY SOLENOID

[76] Inventor: Yasuo Sato, No. 11, Kizukuri-cho, Gifu-shi, Gifu-ken, Japan

[21] Appl. No.: 522,708

[22] Filed: Aug. 12, 1983

[51] Int. Cl.³ .............................................. B60T 13/74
[52] U.S. Cl. ..................................... 60/545; 60/547.1; 60/555
[58] Field of Search ....................... 60/545, 547.1, 555; 91/367, 453; 137/596.18; 251/14, 77, 78; 335/258, 240

[56] References Cited

U.S. PATENT DOCUMENTS

| | | | |
|---|---|---|---|
| 2,092,364 | 9/1937 | Stevens | 91/453 |
| 2,866,838 | 1/1959 | Lucien et al. | 60/545 |
| 2,959,012 | 11/1960 | Johnson | 60/545 |
| 3,656,076 | 4/1972 | Prouty et al. | 335/240 |
| 3,684,071 | 8/1972 | Wheymann | 60/545 |
| 3,756,660 | 9/1973 | Burgdorf | 60/555 |
| 3,797,246 | 3/1974 | Belart et al. | 60/555 |
| 3,856,362 | 12/1974 | Howard | 60/545 |
| 4,044,323 | 8/1977 | Sleger | 335/240 |

FOREIGN PATENT DOCUMENTS 776603 11/1936 France ................................ 335/240

Primary Examiner—Robert E. Garrett
Assistant Examiner—Scott L. Moritz
Attorney, Agent, or Firm—Fleit, Jacobson, Cohn & Price

[57] ABSTRACT

A brake booster is operated both by braking actuated by a brake pedal and by a solenoid. A moving core of the solenoid and a relay valve piston of the brake booster are linked by a balance lever, and the moving core of the solenoid has a much larger mobility than the relay valve piston during braking because the fulcrum of the lever is positioned nearer to the relay valve piston to enable the solenoid to be miniaturized. When the solenoid is actuated, the moving core requires much more time to move than to return. In an automobile equipped with this brake booster, the braking force can be increased gently but interrupted quickly during braking actuated by the solenoid.

8 Claims, 8 Drawing Figures

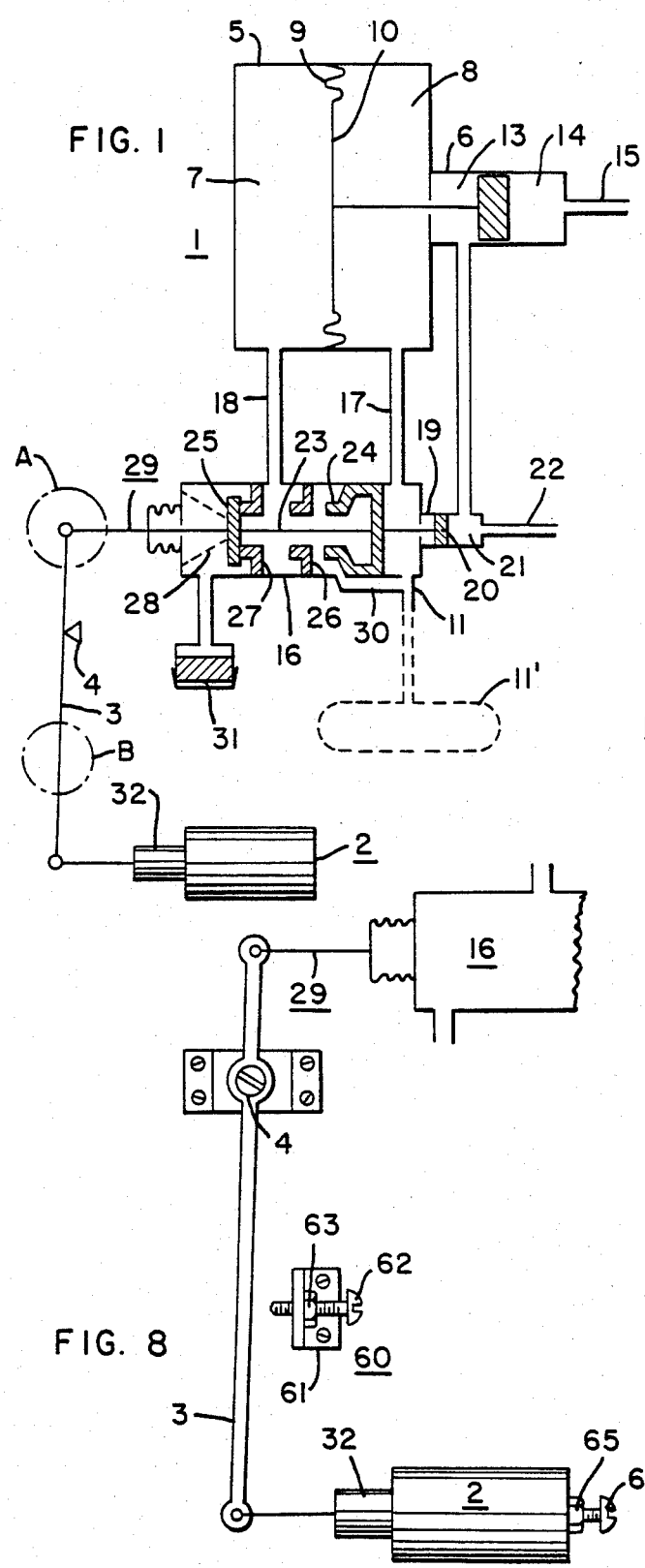
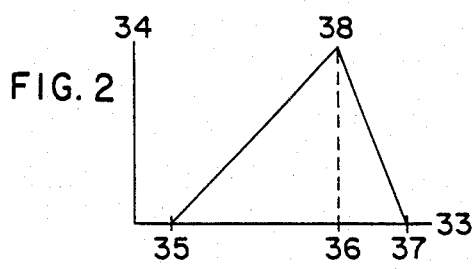
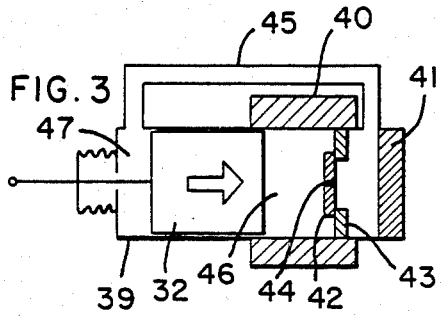
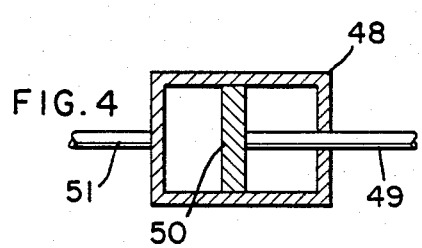
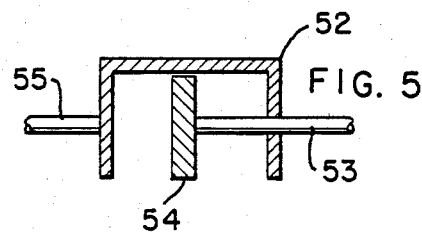
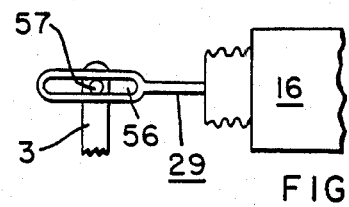
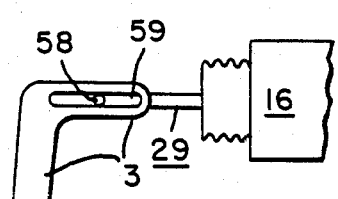

4,494,377

BRAKE BOOSTER OPERATED ALSO BY SOLENOID

BACKGROUND OF THE INVENTION

1. Field of the Invention

The present invention relates to a brake booster wherein the braking force can be increased gently during braking by using a solenoid, but the braking can be quickly interrupted, and braking by a brake pedal can also be applied.

2. Description of the Prior Art

A conventional type of brake booster utilizing vacuum pressure is usually actuated by pressing on the brake pedal, one operated by a solenoid has too abrupt an action for use. An improved type of brake booster with a solenoid already provided by the inventor requires rather delicate adjustments and hence is unsuitable for mass production.

SUMMARY OF THE INVENTION

An object of the present invention is to provide a brake booster which is not only operated by the brake pedal in the conventional way, but the braking is controlled by a solenoid to provide a gentle braking operation, and is also able to interrupt the braking quickly when the brake pedal is released.

Another object of the present invention is to use the system as a braking mechanism for an automobile which is capable of reducing the braking distance while ensuring steering stability.

Another object of the present invention is to use the system in a automobile designed for a physically handicapped person who is unable to press the brake pedal with a foot.

When driving a conventional automobile, there is usually a time-lag of between 0.75 to 1 second before the braking system is actuated by pressing the brake pedal after the driver has decided to stop the automobile on sensing danger or observing a stop signal. The inventor has already thought of braking the automobile temporarily by actuating a solenoid in the brake booster according to this invention during the 0.75 to 1 second period of indecision, thus interrupting the braking to ensure steering stability.

In this invention, the brake-boosting part utilizing vacuum pressure which is known hitherto is called a "brake boosting unit", and that of this invention which is obtained by coupling a solenoid to one part thereof is called, in general, a "brake booster."

BRIEF DESCRIPTION OF THE DRAWINGS

FIG. 1 is a schematic, sectioned front view of the complete system of this invention.

FIG. 2 is a graph of the solenoid's operation with elapsed time along the abscissa and operation duration along the ordinate.

FIG. 3 is a section of a solenoid which can attract a moving core slowly and reset it quickly.

FIG. 4 is a section through a first embodiment of a release coupling.

FIG. 5 is a section through a second embodiment of the release coupling.

FIG. 6 is a front view of the first embodiment of section A in FIG. 1.

FIG. 7 is a front view of the second embodiment of section A in FIG. 1.

FIG. 8 is a front view of section B of FIG. 1.

DETAILED DESCRIPTION OF THE INVENTION

In FIG. 1, (1) denotes a brake boosting unit, (2) a solenoid, and (3) a balance lever acting about a fulcrum (4). The brake boosting unit (1) is provided with a body having a large chamber (5) and a small chamber (6) which are linked, a flexible diaphragm (9) fixed to the inner surface of the large chamber (5) so as to divide the large chamber (5) into a control chamber (7) and a vacuum chamber (8), and a power piston (10) fixed to the diaphragm; the vacuum chamber (8) has a through hole (11) communicating with a vacuum source (11') provided by an engine intake manifold, etc. a hydraulic piston (12) is provided so as to slide in the small chamber (6), coupled to the power piston (10), the chamber space (6) is divided into an oil pressure control chamber (13) and a high pressure chamber (14) by the hydraulic piston (12), and the high pressure chamber is provided with a through hole (15) communicating with the braking mechanism of the automobile.

(16) denotes a relay valve cylinder provided adjacent to the large chamber (5), the relay valve cylinder (16) is connected to the vacuum chamber (8) by a vacuum pipe (17), and also to the control chamber (7) by a control pipe (18). (19) denotes a second small chamber connected to the relay valve cylinder (16), which is provided with a valve piston (20) therein, the space formed by the piston and the second small chamber (19) acts as a relay control chamber (21) which is connected to the oil pressure control chamber (13) and is provided with a through hole (22) connecting it to a braking system such as a master cylinder and the like.

(23) denotes a rod of the valve piston (20), a vacuum valve (24) and an atmospheric air valve (25) are provided on the rod, the vacuum valve (24) is normally isolated from a valve seat (26) and the atmospheric air valve (25) is kept pressed against a valve seat (27), and a relay valve piston (29) comprising the group of the vacuum valve (24), the atmospheric air valve (25), the valve piston (20), and the rod (23) is pushed to the right in the drawing by a leaf spring (28).

(30) denotes a relay passage, normally the region formed by the control chamber (7), the control pipe (18), the vacuum valve (24), and the valve seat (26); the relay passage (30); and the region between the vacuum pipe (17) and the vacuum chamber (8) communicate with each other.

In the above unit, when the brake is applied by pressing on the brake pedal or other means, the valve piston (20) is pushed to the left in the drawing by increasing pressure in the relay control chamber (21), and the hydraulic piston (12) is pushed to the right in the drawing by the increasing pressure in the oil pressure control chamber (13) which communicates with the relay control chamber (21), thus actuating the braking mechanism of the automobile. As will be easily understood, the brake operated by pressing the brake pedal will not be effected if an unexpected situation occurs such as the vacuum source is lost due to engine malfunction, something is wrong with the relationship between the atmospheric air valve (25) and its valve seat or the vacuum valve (24) and its valve seat, or the power piston (10) has a faulty circumference, therefore the braking effect will not be destroyed if any of these failures occurs. When all the parts are free from failures, the vacuum valve (24) is pressed onto the valve seat (26) to block the relay path (30) as the valve piston (20) is pushed, and thus the control chamber (7) is prevented from communicating with the vacuum chamber (8). The atmospheric air valve (25) is then removed from the valve seat (27) so that air which has passed through a cleaner element (31) flows into the control chamber (7) and, since the vacuum chamber (8) remains at a low pressure despite the tendency toward atmospheric pressure in the control chamber, the power piston (10) is pushed strongly to the right in the drawing due to the pressure difference. Therefore, the automobile is braked more powerfully than by human power, and braking can be obtained easily even if the brake pedal is pressed weakly.

Next, when the brake pedal is released, the pressure within the relay control chamber (21) becomes static, the valve piston (20) returns to its home position, the atmospheric air valve (25) is pressed onto the valve seat (27), and the vacuum valve (24) is removed from the valve seat (26); therefore the air in the control chamber (7) is absorbed by the vacuum source (11'), the control chamber (7) communicates with the vacuum chamber (8), and the power piston (10) thus returns to its home position; the pressure within the oil pressure control chamber (13) drops due to the reduction in pressure in the relay control chamber (21), the hydraulic piston (12) returns to it home position, and thus the brake is released.

As can be understood from the above description, pulling the valve piston (20) to the left in the drawing enables braking without pressing the brake pedal, and when there is a space between each of the vacuum valve (24) and the atmospheric air valve (25) and its respective valve seat, part of the air which has flowed into the relay valve cylinder (16) enters the control chamber (7) and the rest is absorbed by the vacuum source (11'), thus bringing about a partial braking state. Then the braking force is increased gradually as the valve piston rod (23) is pulled slowly to the left in the drawing and, while the rod (23) can be pulled about 3 mm during full braking and at about 2 mm during partial braking, the moving core (32) moves 8 to 10 mm, therefore the fulcrum (4) of the balance lever (3) is positioned near to the rod (23) of the valve piston to balance the two, and thus the solenoid (2) can work with a smaller capacity than is normal. It goes without saying that the action of pulling the valve piston rod (23) corresponds to that of pulling the relay valve piston (29) consisting of the atmospheric air valve (25) and the vacuum valve (24) which are provided on the rod, and the valve piston (20).

The solenoid (2) takes 70 to 120 msec to move the moving core (32) through 8 to 10 mm, and 10 to 30 msec to return it through 8 to 10 mm, therefore, as shown in FIG. 2 in which elapsed time is indicated on the abscissa (33) and the duration of operation on the ordinate (34), the time required for moving is between (35) and (36) and the time required for returning is between (36) and (37).

FIG. 3 shows a solenoid wherein a moving core can be attracted slowly and reset quickly, in the drawing (39) denotes a nonmagnetic enclosing cylinder with a solenoid coil (40) fixed outside, and (32) denotes the moving core. The enclosing cylinder (39) is open to the atmosphere through an air filter (41) and is provided with a closing diaphragm (43) with a valve (42) opening inward. Either the valve (42) or the closing diaphragm (43) is provided with an air hole (44), the other side of the opening in the enclosing cylinder (39) communicates with the atmosphere through a communication tube (45), or other means.

When a current is supplied to the solenoid coil (40), the moving core (32) is attracted in the direction indicated by the arrow, the inward-opening valve (42) closes to raise the pressure in a chamber (46), and depending on the suppression effect by the pressure and the quantity of the air per unit time which leaks out of the air hole (44), the time required for the moving core (32) to move is determined at between 70 to 300 msec, which can be set beforehand. Next, when the current is interrupted, the moving core (32) returns to its home position, the valve (42) opens and the air in a rear chamber (47) escapes to the atmosphere through the communication tube (45), therefore the time required for returning is 10 to 30 msec, as in a conventional solenoid. Namely, as shown in FIG. 2, the interval (35)-(36) increases, the interval (36)-(37) remains the same, and the maximum mobility (36)-(38) of the moving core is the same as in a conventional solenoid. In other words, because the interval (35)-(36) is increased and the inclination (35)-(38) becomes more gentle, this indicates the situation in which the braking force increases gradually, and because the interval (36)-(37) is almost the same means that the moving core (32) is reset quickly. When there is a defect in the airtightness between the enclosing cylinder (39) and the moving core (32), the closing diaphragm (43) and the moving core (32) can be linked by a flexible passage; and variable packing or a variable gas seal used for a gas holder which keeps its airtightness when it is pulled in one direction and releases it when it moves in the other direction can be provided for the moving core (32), or any other available means can be employed.

FIG. 4 and FIG. 5 refer to coupling means acting between the relay valve piston (29) and the lever (3). FIG. 4 represents a combination of a box member (48) with a slide hole, a shaft (49) through the slide hole, a piston member (50) attached to the shaft and able to travel within the box member (48), and a coupling shaft (51) attached to the box member (48), in which the coupling shaft (51) is linked to the lever (3) when the shaft (49) is connected to the relay valve piston (29), for example. In this case, the relative positions of the box member (48) and the piston member (50) are set so that the relay valve piston (29) can be pulled directly by the shaft (49) when the coupling shaft (51) is pulled by the lever (3) when the solenoid (2) is actuated. When braking is performed using the brake pedal, the relay valve piston (29) is actuated to push the piston member (50) via the shaft (49), the piston member (50) travels within the box member (48) so that the box member (48) is not pushed, and consequently braking applied by the brake pedal will not influence the solenoid (2) and the balance lever (3).

FIG. 5 shows a combination of a U-shaped member (52) with a slide hole, a shaft (53) through the slide hole, a travelling stop member (54) attached to the shaft and able to travel within the U-shaped member (52), and a coupling shaft (55) attached to the U-shaped member (52), in which the coupling shaft (55) is linked to the lever (3) when the shaft (3) is connected to the relay valve piston (29), for example. In this case, the relative positions of the U-shaped member (52) and the travelling stop member (54) are set so that the relay valve piston (29) can be pulled directly by the shaft (53) when the coupling shaft (55) is pulled by the lever (3) when the solenoid (2) is actuated. The working effects are the same as those described with reference to FIG. 4.

FIG. 6 and FIG. 7 refer to coupling means acting between the relay valve piston (29) and the lever (3). In FIG. 6, an elliptical hole (56) provided at the junction with the relay valve piston (29) is held by a pin (57) on the lever (3), the elliptical hole (56) has a position at which the relay valve piston (29) can be pulled directly when actuated by the solenoid (2), and also an allowance whereby the pin (57) is able to travel so that the solenoid is not affected by braking using the brake pedal. In FIG. 7, a pin (58) provided at the junction with the relay valve piston (29) is held by an elliptical hole (59) formed in the lever (3), the elliptical hole (59) has a position at which the relay valve piston (29) can be pulled directly when actuated by the solenoid (2), and also an allowance whereby the pin (58) is able to travel so that the solenoid (2) is not affected by braking using the brake pedal. Namely, FIG. 6 and FIG. 7 represent devices providing similar effects to the coupling devices of FIG. 4 and FIG. 5 by combining an elliptical hole and a pin.

FIG. 8 shows an adjustment mechanism (60) whereby the mobility of the moving core (32) can be limited, which comprises an adjustment bed (61) fixed to a base, an adjustment screw (62) screwed therein to limit the mobility of the moving core (32), and a locking nut (63). The mobility of the moving core (32) can be limited by turning the adjustment screw (62) to the left in the drawing so that the maximum mobility (36)-(38) of the moving core (32) in FIG. 2 is reduced, and also that a partial-braking state can be created according to the position of the adjustment screw (62). The adjustment mechanism (60) given in FIG. 8 is merely an illustrative example, therefore a mechanism can be employed in which an adjustment screw (64) limiting the rate of attraction of the moving core (32) is provided in the solenoid (2), and the screw (64) is fixed by a locking nut (65) after it is screwed as far as a suitable position, and the place at which the adjustment mechanism is installed can be changed for the same object.

All of what has been described above refers to an ideal status, however the invention may be practiced in other ways, within the scope of the purpose thereof, than those specifically illustrated and described.

What is claimed is:

1. A brake booster comprising:
    (a) a body with a large chamber and a small chamber linked to each other,
    (b) a power piston movably positioned in the large chamber so as to divide it into a control chamber and a vacuum chamber,
    (c) means for providing communication between said vacuum chamber and a vacuum source,
    (d) a hydraulic piston provided in said small chamber to divide it into an oil pressure control chamber and a high pressure chamber, said hydraulic piston operatively coupled to move with the power piston,
    (e) means for providing communication between said high pressure chamber which communicates with a fluid operated vehicle braking mechanism,
    (f) a relay valve cylinder with one end exposed to the atmosphere and the other end communicating with a source of vacuum, means to permit communication between the source of vacuum and the control chamber via a control pipe,
    (g) atmospheric air valve means and vaccum valve means provided in the relay valve cylinder and operable in response to brake operation to change the position of the cylinder vacuum valve means to permit communication between the control pipe and the vacuum chamber, each said valve means having valve seats, said relay valve cylinder including a valve piston connected to said atmospheric air valve means and said vacuum valve means,
    (h) relay valve piston means for linking the atmospheric air valve means and the vacuum valve means,
    (i) a solenoid having a movable solenoid plunger; and
    (j) lever means interconnecting said solenoid plunger and said relay valve piston means, said lever means pivotable about a fulcrum.

2. The brake booster as defined in claim 1 wherein the fulcrum of the lever means is set at a position nearer to said relay valve coupling means than to said solenoid.

3. The brake booster as defined in claim 1, said solenoid comprising:
    (a) an enclosing cylinder having a solenoid coil secured to the outside thereof,
    (b) a closing diaphragm positioned within said enclosing cylinder, said diaphragm having a valve opening inward, an air filter, and an opening in said cylinder to permit communication between said inward-opening valve and the atmosphere,
    (c) said opening in said cylinder communicating with the atmosphere through the air filter,
    (d) said movable solenoid plunger having a coupling means connected to said lever means (3), and
    (e) said inward-opening valve having an air hole to permit air to escape from said enclosing cylinder at a predetermined, controlled rate.

4. The brake booster as defined in claim 1 wherein coupling means is provided for linking the relay valve piston means and the lever means, said coupling means comprising a release coupling including a combination of a box member with a slide hole, a shaft slidable through the slide hole, a piston member fixed to said shaft and movable in said box member.

5. The brake booster as defined in claim 1 including coupling means provided between the relay valve piston means and the lever means, said coupling means comprising an elliptical hole provided on said relay valve piston means and a pin on said lever means, said elliptical hole receiving said pin and having a position at which the relay valve piston means can be pulled directly when actuated by said solenoid, and also an allowance whereby the pin is able to travel so as not to influence said solenoid when actuated by a brake pedal.

6. The brake booster as defined in claim 1 including an adjustment mechanism for limiting the movement of said moving core, whereby the quantity per unit time of air flow into said control chamber is minimized, thereby creating a partial-braking state.

7. The brake booster as defined in claim 1 wherein coupling means is provided for linking the relay valve piston and the lever means, said coupling means comprising a release coupling including a combination of a U-shaped member with a slide hole, a shaft slidable through the slide hole, and a travelling stop member fixed to said shaft and movable in said U-shaped member.

8. The brake booster as defined in claim 1 including coupling means provided between the relay valve piston means and the lever means, said coupling means comprising a pin provided on said relay valve piston means and received in an elliptical hole provided in said lever means, said elliptical hole having a position at which the relay valve piston means can be pulled directly when actuated by said solenoid, and also an allowance whereby the pin is able to travel so as not to influence said solenoid when actuated by a brake pedal.

* * * * *